Aug. 27, 1940.  J. T. HAYWARD  2,213,138
METHOD AND APPARATUS FOR DETECTING OIL IN WELL DRILLING
Filed July 1, 1939
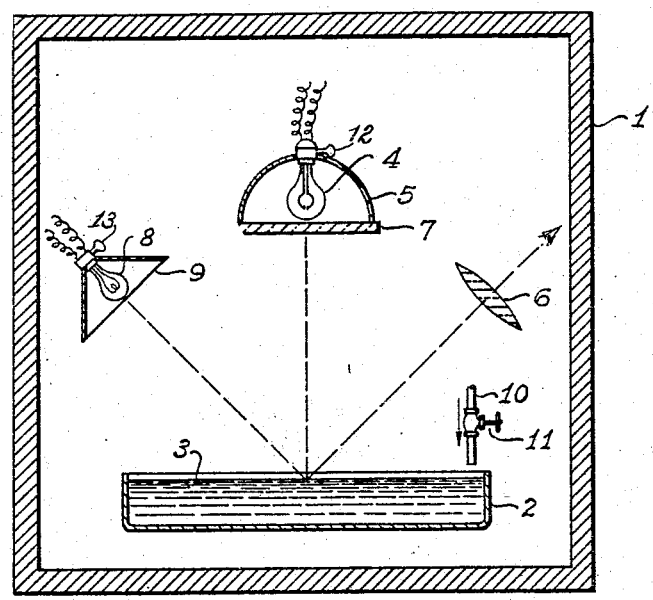
INVENTOR
J.T.HAYWARD
BY
ATTORNEY Patented Aug. 27, 1940

2,213,138

UNITED STATES PATENT OFFICE 2,213,138

METHOD AND APPARATUS FOR DETECTING OIL IN WELL DRILLING

John T. Hayward, Tulsa, Okla.

Application July 1, 1939, Serial No. 282,473

9 Claims. (Cl. 250—83)

This invention relates to a method and apparatus for detecting the presence of oils, particularly crude petroleum oils, in drilling fluids such as the mud fluids ordinarily used in well drilling, and especially during the drilling operation while the drilling fluid is being circulated through the well.

In accordance with conventional rotary drilling practice, particularly as practiced in the method of detecting oil embodying this invention, a mud fluid consisting generally of a suspension of clay solids in water, is circulated through the well during the drilling for the purpose of washing the cuttings from the well, plastering the wall of the bore hole, keeping the bit clean, etc. Ordinarily the specific gravity of the drilling fluid is so controlled that the hydrostatic head of fluid in the well is in excess of the pressure of the oil, gas or water present in any formations traversed by the drill. As a result of the excess head pressure of the column of drilling fluid, when an oil-containing formation is pierced by the drill no substantial flow of oil into the drilling fluid can occur and the only oil which will be present in the drilling fluid is that relatively small quantity contained in the comparatively small core or cylinder of the formation drilled out by the bit. This small quantity of oil will become widely dispersed in the drilling fluid in the form of relatively minute globules due to the agitation by the bit and to the fact that often as much as 100 barrels of drilling fluid will be circulated for each lineal foot drilled. Since the drilling fluid is ordinarily a relatively viscous clay slurry, these minute globules become tightly occluded in the drilling fluid and are rendered substantially completely invisible under ordinary light conditions and will ordinarily not separate from the drilling fluid even when allowed to stand for lengthy periods of time.

Unless the presence of the small amounts of oil is detected immediately after they emerge from the well with the drilling fluid, the drilling operation may be carried completely through the oil containing formation unknown to the drill operator, and the formation may, and frequently does, become sealed off by the clay solids in the drilling fluid, and the presence of an oil formation in the well may thus remain undiscovered entirely and the well erroneously abandoned as a non-producer with consequent great economic loss, or even if later discovered, difficult and expensive clean-out operations may be required to make the well a producer.

In accordance with this invention a method is provided for detecting the presence of crude petroleum oil in the strata of an oil well while being drilled by the employment of a circulating comparatively viscous mud fluid; the drilling fluid is caused to flow upwardly in the well at a rate which is large compared to the rate of penetration of the oil stratum being drilled and while the fluid column is maintained at a head exceeding the head of the stratum being drilled; in such procedure any oil from the core drilled from the stratum is dilutedly dispersed in minute and normally invisible quantities in the drilling fluid return at the top of the well; the return is then subjected to a fluorescence-exciting ray to render the oil from that stratum visible by fluorescence.

It has been discovered that when mud drilling fluids, which contain crude petroleum oil under the conditions noted above are subjected to reflection of fluorescence-exciting rays from suitable sources, ordinary light being excluded, fluorescense of the oil globules takes place rendering the oil globules visible and distinguishable from the occluding mud slurry. Light of the wave length of ultra-violet light is one form of light which is found to be particularly suitable for this purpose, although other portions of the spectrum also may be used successfully. It is found, however, that often the oil globules are so fine and so widely dispersed in the mud fluid that few, if any, globules will be present at the surface of a sample of the fluid, the globules being occluded by the mud, because of the thixotropic nature of the fluid, and are held immersed in the body of the fluid. Under these conditions it is necessary to treat the mud fluid to be examined with suitable treating agents adapted to reduce the viscosity and gel strength of the fluid so that the oil globules may be released and permitted to rise to the surface of the fluid where such globules may be subjected to the inspection light rays. This invention contemplates, among other improvements, the step of pre-treating the fluid to bring the oil globules to the surface thereof. A treating agent suitable for this purpose is hot water, however, chemically acting viscosity reducing agents such as weak organic acids such as tannic, gallic and humic acid, sodium hexa-metaphosphate, sodium tetra-pyrophosphate, sodium tetra-phosphate, di-sodium phosphate, sodium hydroxide and others, and mixtures of the foregoing substances, are particularly suitable for this purpose, because the addition of water tends to form emulsions, and, moreover, dilutes the fluid while chemically acting viscosity reducing agents, on account of the small addition that is required to reduce viscosity, do not have those disadvantageous effects.

Also, the mud fluid is ordinarily contaminated with small particles of other oleaginous substances, such as the various oils and greases employed about the drilling equipment and especially tool joint grease, which is used to lubricate the tool joints connecting together the sections of the drill pipe. The circulation of the mud fluid through the drill pipe and up around the outside thereof during the ordinary course of drilling washes such grease from the pipe joints and the grease thereupon becomes dispersed throughout the mud fluid. The particles of oleaginous matter such as the tool joint grease, will fluoresce similarly to the globules of crude oil when exposed to the inspection light and a method must be provided for distinguishing such other substances, and particularly tool joint grease, from crude oil in order to avoid erroneous results. It is found that such other oleaginous substances and particularly tool joint grease, when viewed under ordinary daylight, will appear as black or dark specks in the mud fluid while the globules of crude oil are ordinarily invisible under such light. As noted, however, when subjected to ultra-violet light, both the crude oil and the tool joint grease fluoresce similarly. To definitely distinguish between these materials, this invention contemplates a further improvement, whereby, the mud fluid is subjected first to the inspection light to produce fluorescence of all of the oleaginous substances, to thereby indicate the relative spatial position of the globules of oleaginous materials in the mud fluid, and then subjecting the fluid to ordinary light. The globules of crude oil will then become invisible while the specks or globules of the tool joint grease remains visible, not as fluorescent specks but as dark specks, which are clearly discernible in the mud fluid. In practice, this method is found relatively easy of accomplishment since the sample of the mud fluid is ordinarily viewed under magnifying conditions as though a lens, and comparatively few globules will appear in any portion of the object field and will be comparatively widely scattered, and the inspection can be concentrated on a relatively small number of such globules. Thus, by first subjecting the sample to the source of fluorescent light, all the oleaginous particles will fluoresce. The position in the object field of one or more of these particles is then noted, and the ordinary light rays turned on while the observer continues to look at the selected fluorescing particles. If such particles fade completely from view, the particles are crude oil. If they all lose their fluorescence and appear as visible dark or black specks, then they are tool joint grease. If some become invisible while others remain visible as dark specks then it is known that both crude oil and tool joint grease are present. By use of a proper magnifying lens, a single globule may be segregated for inspection or a small group may be selected for examination.

The present invention, therefore, has for its principal object, the provision of a method for detecting the presence of crude petroleum oil in in well drilling fluids.

Another object is to provide a novel method for detecting the presence of crude petroleum oil in mud drilling fluids by inspection with a fluorescence exciting light.

An additional object is to provide a method for distinguishing crude petroleum oil from other oleaginous substances present in mud drilling fluids.

A more particular object is a method of detecting crude petroleum oil in mud drilling fluids by subjecting the latter to the reflected rays of ultra-violet light.

Still another object is to subject mud drilling fluids successively to reflected ultra-violet light and to ordinary daylight to thereby detect crude petroleum oil in said fluids and to distinguish said oil from other oleaginous substances such as tool joint grease.

An additional object is to provide a method for detecting crude petroleum oil in drilling muds whereby the drilling mud is pre-treated with a viscosity reducing agent to release occluded globules of said oil and bring same to the surface of the fluid for examination under reflected ultra-violet light.

A further object is to provide apparatus suitable for practicing successfully the foregoing methods.

Other and more specific objects of this invention will be apparent from the following detailed description taken in conjunction with the accompanying drawing which illustrates diagrammatically a form of apparatus suitable for successfully practicing the method steps of this invention.

Referring to the drawing, the apparatus there shown diagrammatically includes a housing 1 which may be either a daylight-excluding box in which the apparatus is housed or may represent the walls of a dark room in which both the apparatus and the observer may be stationed. A shallow container 2 is positioned within housing 1 and is adapted to contain a sample of well drilling fluid 3 to be examined for the detection of the presence of crude petroleum. The upper end of container 2 is open so as to expose the surface of the sample fluid 3 to the rays of a fluorescence-exciting lamp 4 positioned directly above container 2, and mounted in front of a reflector 5 adapted to reflect the rays emanating from the lamp 4 on to the surface of the sample of fluid 3 and thence through a magnifying lens 6 to the eyes of an observer. Lamp 4 is preferably a conventional mercury lamp, adapted to emit rays within the ultra-violet portion of the spectrum and will ordinarily be provided with a screen for screening out the visible portion of the spectrum. As illustrated in the drawing, a screen 7 is provided across the mouth of reflector 5 to screen out the visible rays, and permit only the ultra-violet rays emitted from the lamp to strike the surface of the sample for reflection therefrom. An ordinary visible ray lamp 8 mounted in front of a reflector 9 is positioned in housing 1 and adapted to emit ordinary light rays for reflection from the surface of the sample through the lens 6 to the eye of the observer. The lamps are conventionally connected by wire leads to suitable source of electric current with the usual switches or buttons such as shown at 12 and 13 to connect either or both lamps, in order to control the direction of either or both rays on the field viewed at 6. A pipe 10 fitted with a valve 11 is arranged to permit mixing of suitable treating agents with the sample of fluid in container 2.

The above apparatus is employed in the following manner in practicing the novel method of this invention. A sample of the mud fluid 3 to be examined for the presence of crude petroleum oil is placed in container 2, and mixed, through pipe 10, with a quantity of hot water, generally in equal volume with the sample, or with a small portion of one or more of the several chemical treating agents referred to above. Or a hot water solution of one or more of the above listed treating agents may be thoroughly mixed with the mud fluid. The addition of any of these treating agents greatly thins the mud fluid and reduces its viscosity and upon allowing the mixture to stand for a very short interval of time, the occluded oleaginous particles will be released from the mud fluid and, because of their relatively lower specific gravity, will rise to the surface of the sample in container 2. The treated sample is then placed in housing 1 which as noted above may be dark box or a dark room adapted to exclude extraneous light rays, and ultra-violet light rays generated in lamp 4 are directed against the surface of fluid 3 and reflected therefrom through the magnifying lens 6 to the eye of the observer. Exposure to the ultra-violet rays will cause the oleaginous particles on the surface of the fluid to fluoresce very strongly, and the fluorescent particles will become clearly visible to the observer. By means of the magnification afforded by lens 6, the observer can then fix his inspection upon a portion of the object field and note the relative spatial position therein of the fluorescing particles. Keeping his gaze on these particular particles, he now switches on the daylight lamp 8 without switching off the ultra-violet lamp 4. Immediately, if all of the oleaginous particles are crude petroleum oil, they will fade from view, the fluorescence-exciting effect of the ultra-violet rays being screened out or absorbed by the visible rays from lamp 8. This will immediately indicate to the observer that all the oleaginous particles are crude petroleum oil and the presence of such oil in the mud fluid is thus definitely determined.

On the other hand, if upon switching on of the visible ray lamp 8, none of the particles in the part of the object field upon which the observer has fixed his attention fade from view but merely change their appearance from fluorescent to black or take on the appearance of dark specks, the observer will be apprised immediately that the oleaginous particles in the mud fluid are not crude petroleum oil but are merely some extraneous substance, probably tool joint grease or the like. Again, if some of the fluorescent specks fade from view under the rays of the visible ray lamp, while others become visible as dark specks, this will be an indication that both crude petroleum oil and some other extraneous oleaginous substances are present in the mud fluid. This, of course, will serve to detect the presence of crude petroleum oil in the mud, despite the presence of other oleaginous substances.

It is preferable to keep the sample exposed to the ultra-violet rays when the visible rays are switched on, as the change in the particles from fluorescence to non-fluorescence or invisibility to visibility, as the case may be, is very marked to the observer who keeps his attention fixed on particular particles. However, satisfactory results may be obtained by first examining the sample under the ultra-violet rays, then switching these off and then turning on the visible ray lamp.

The method of this invention may be performed intermittently on separate samples of the mud fluid, or it may be performed continuously, by flowing a continuous sample of the mud stream through the inspection apparatus at a sufficiently slow rate so that exposure successively to the ultra-violet and visible rays may be effected while the observer keeps his attention fixed upon particular particles as they pass through the object field.

The quantity of treating agent used will vary, of course, with the nature of the particular agent selected. When hot water is used, it is preferably mixed in equal volumes with the sample, though greater or less quantities may be used. The temperature of the water is also variable but may be any suitable temperature which is below the boiling point of water, but which will raise the temperature of the mixture with the sample to such a temperature as will effect release of occluded oil from the mud. A satisfactory temperature for the mixture in many cases is about 150 degrees F.

Where one of the other chemical treating agents enumerated above is used, generally only very small proportions are required, such as a one-half to two or three percent of the sample. Where the treating agents are added in liquid form, as in aqueous solution, only a few drops of such a solution will ordinarily be required to free the oleaginous particles. Elevated temperatures may or may not be required in these cases. Instead of using the described combination of ultra-violet rays and visible rays for examination of the mud fluid, other portions of the spectrum may be used, which are adapted to produce fluorescence of distinctly different color for the crude petroleum oil and other oleaginous substances.

In accordance with this invention, therefore, the drilling mud return from an oil well, that is, the drilling mud issuing from the well, is subjected to a fluorescence-exciting ray to render the crude petroleum oil in the field as viewed by the observer, visible by fluorescence; by, however, subjecting the same field to a visible light ray the presence of the oil in the field can be checked, because the crude petroleum oil show will then fade out, while greases will stand out as dark spots. This checking can be accomplished by subjecting the same field to a visible light ray while subject to the fluorescence exciting ray or by subjecting the same field to a visible light ray in the absence of the fluorescence-exciting ray. This checking may be carried out still more completely after subjecting the return to a fluorescence-exciting ray by successively subjecting the same field to a visible ray, while subject to the fluorescence exciting ray, and subjecting the same field to the visible light ray in the absence of the fluorescence exciting ray. By treating the return with a small percentage of a chemically-acting viscosity reducing agent before subjecting the treated return to a fluorescence-exciting ray, not only is the viscosity of the return in the field reduced so as to render the oil more readily visible, but the dilution of the return in the field will be minimum so as to include the maximum amount of oil, which may be present, in that field.

It will be understood that various alterations and modifications may be made in the size, form, and arrangement of parts of the apparatus of this invention and in the method steps thereof without departing from the scope of the appended claims.

What I claim and desire to secure by Letters Patent is:

1. The method of detecting minute and normally invisible quantities of crude petroleum oil in the drilling mud return from an oil well, comprising, subjecting the return to a fluorescence-exciting ray to render the oil in the field visible by fluorescence and subjecting the same field to a visible light ray in order to check for the presence of the oil in the field.

2. The method of detecting minute and normally invisible quantities of crude petroleum oil in the drilling mud return from an oil well, comprising, subjecting the return to a fluorescence-exciting ray to render the oil in the field visible by fluorescence and subjecting the same field to a visible light ray while subject to the fluorescence-exciting ray.

3. The method of detecting minute and normally invisible quantities of crude petroleum oil in the drilling mud return from an oil well, comprising, subjecting the return to a fluorescence-exciting ray to render the oil in the field visible by fluorescence and subjecting the same field to a visible light ray in the absence of the fluorescence-exciting ray.

4. The method of detecting minute and normally invisible quantities of crude petroleum oil in the drilling mud return from an oil well, comprising, subjecting the return to a fluorescence-exciting ray to render the oil in the field visible by fluorescence, subjecting the same field to a visible light ray while subject to the fluorescence-exciting ray and subjecting the same field to the visible light ray in the absence of the fluorescence-exciting ray.

5. The method of detecting minute and normally invisible quantities of crude petroleum oil in the drilling mud return from an oil well, comprising, treating the return with a small percentage of a chemically acting viscosity-reducing agent and subjecting the treated return to a fluorescence-exciting ray to render the oil in the field visible by fluorescence.

6. The method of detecting minute and normally invisible quantities of crude petroleum oil in the drilling mud return from an oil well, comprising, treating the return with a small percentage of a chemically acting viscosity-reducing agent, subjecting the treated return to a fluorescence-exciting ray to render the oil in the field visible by fluorescence and subjecting the same field to a visible light ray in order to check for the presence of the oil in the field.

7. An apparatus for detecting minute and normally invisible quantities of crude petroleum oil in the drilling mud return from an oil well, comprising, means for directing a fluorescence-exciting ray on the return to render the oil in the field visible by fluorescence and means for directing a visible light ray on the same field in order to check for the presence of the oil in the field.

8. An apparatus for detecting minute and normally invisible quantities of crude petroleum oil in the drilling mud return from an oil well, comprising, means for directing a fluorescence-exciting ray on the return to render the oil in the field visible by fluorescence, means for directing a visible light ray on the same field in order to check for the presence of the oil in the field, and means for controlling said directing means to subject the field to either ray.

9. The method of detecting the presence of crude petroleum oil in the strata of an oil well while being drilled by the employment of a circulating comparatively viscous mud fluid, comprising, causing the drilling fluid to flow upwardly in the well at a rate which is large compared to the rate of penetration of the oil stratum being drilled and while the fluid column is maintained at a head exceeding the head of said stratum, whereby any oil from the core drilled from the stratum is dilutedly dispersed in minute and normally invisible quantities in the drilling fluid return at the top of the well, and subjecting the return to a fluorescence-exciting ray to render the oil from said stratum visible by fluorescence.

JOHN T. HAYWARD.